United States Patent
Broberg et al.

(10) Patent No.: US 7,568,093 B2
(45) Date of Patent: Jul. 28, 2009

(54) SYSTEM AND METHOD FOR SERVICE TAGGING FOR ENHANCED PACKET PROCESSING IN A NETWORK ENVIRONMENT

(75) Inventors: Robert M. Broberg, Berwyn, PA (US); Mark Grayson, Cary, NC (US); Louis F. Menditto, Raleigh, NC (US); Rafael M. Montalvo, Raleigh, NC (US); Chris O'Rourke, Apex, NC (US); Timothy P. Stammers, Raleigh, NC (US); Marco C. Centemeri, Rho (IT); Jayaraman R. Iyer, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 824 days.

(21) Appl. No.: 10/977,218

(22) Filed: Oct. 28, 2004

(65) Prior Publication Data

US 2006/0072573 A1   Apr. 6, 2006

Related U.S. Application Data

(63) Continuation of application No. 10/959,810, filed on Oct. 5, 2004.

(51) Int. Cl.
 *H04L 9/00* (2006.01)
 *G06F 17/00* (2006.01)
(52) U.S. Cl. .......................... 713/153; 713/160; 726/1; 726/13; 726/14
(58) Field of Classification Search ................ None
 See application file for complete search history.

(56) References Cited

U.S. PATENT DOCUMENTS

| | | | |
|---|---|---|---|
| 5,602,907 A | 2/1997 | Hata et al. | 379/114 |
| 5,822,411 A | 10/1998 | Swale et al. | 379/111 |
| 5,828,737 A | 10/1998 | Sawyer | 379/114 |
| 5,909,238 A | 6/1999 | Nagashima et al. | 348/3 |
| 5,946,670 A | 8/1999 | Motohashi et al. | 705/400 |
| 5,987,498 A | 11/1999 | Athing et al. | 709/203 |
| 6,016,509 A | 1/2000 | Dedrick | 709/224 |

(Continued)

OTHER PUBLICATIONS

Online Inc., "Apogee Releases Content Usage-Based Billing Product Annotated Title—Software allows content usage-based billing," EContent, vol. 24, No. 5, NDN 173-0356-6509-7, 1 pg, Jul. 2001.

(Continued)

*Primary Examiner*—Kaveh Abrishamkar
(74) *Attorney, Agent, or Firm*—Baker Botts L.L.P.

(57) ABSTRACT

An apparatus for charging in a network environment is provided that includes an access gateway encapsulation/decapsulation element operable to establish one or more packet data protocol (PDP) links on behalf of an end user and to perform encapsulation and decapsulation operations for one or more of the links associated with the end user. The access gateway encapsulation/decapsulation element is further operable to interface with a client services packet gateway (CSPG) that is operable to provide enhanced packet processing for the end user for requested information. The apparatus also includes an access gateway policy element operable to interface with the CSPG. The access gateway encapsulation/decapsulation element and the access gateway policy element cooperate to use one or more inter-module headers in order to coordinate the enhanced packet processing for one or more communication flows associated with the end user.

22 Claims, 3 Drawing Sheets

U.S. PATENT DOCUMENTS

| | | | |
|---|---|---|---|
| 6,035,281 | A | 3/2000 | Crosskey et al. ............... 705/14 |
| 6,070,192 | A | 5/2000 | Holt et al. ................... 709/227 |
| 6,075,854 | A | 6/2000 | Copley et al. ............... 379/211 |
| 6,131,024 | A | 10/2000 | Boltz ......................... 455/405 |
| 6,141,684 | A | 10/2000 | McDonald et al. .......... 709/222 |
| 6,175,879 | B1 | 1/2001 | Shah et al. .................. 709/330 |
| 6,208,977 | B1 | 3/2001 | Hernandez et al. ........... 705/34 |
| 6,282,573 | B1 | 8/2001 | Darago et al. ............... 709/229 |
| 6,295,447 | B1 | 9/2001 | Reichelt et al. ............. 455/417 |
| 6,480,485 | B1 | 11/2002 | Kari et al. ................... 370/352 |
| 6,611,821 | B2 | 8/2003 | Stahl et al. .................. 705/400 |
| 6,665,537 | B1 | 12/2003 | Lioy ........................... 455/435 |
| 6,671,675 | B2 | 12/2003 | Iwamura ...................... 705/30 |
| 6,728,266 | B1 | 4/2004 | Sabry et al. ................. 370/468 |
| 6,757,371 | B2 | 6/2004 | Kim et al. .............. 379/114.22 |
| 7,133,511 | B2 * | 11/2006 | Buntin et al. ............... 379/189 |
| 2001/0017856 | A1 * | 8/2001 | Asokan et al. .............. 370/389 |
| 2001/0023428 | A1 | 9/2001 | Miyazaki et al. ............ 709/201 |
| 2002/0138601 | A1 | 9/2002 | Piponius et al. ............. 709/223 |
| 2003/0108030 | A1 * | 6/2003 | Gao ............................ 370/351 |
| 2004/0174900 | A1 * | 9/2004 | Volpi et al. .................. 370/466 |

OTHER PUBLICATIONS

Centaur Communications, "Secret Bear platform allows paid-for SMS Annotated Title—Secret Bear introduced cross-network reverse billing platform allowing content providers to charge for SMS content," New Media Age, NDN 173-0354-6130-3, 1 pg, Jun. 28, 2001.

Karsten Lüttge, "E-Charging API: Outsource Charging to a Payment Service Provider," NDN 174-0708-0924-8, pp. 216-227, 2001.

A. Herzberg, "Safeguarding Digital Library Contents: Charging for Online Content," D-Lib Magazine, NDN 174-0590-9051-8, 16 pgs, Jan. 1998.

Business Wire, "Apogee Networks Introduces Industry's First Content Usage-Based Billing Solution for Web Hosters," NDN 219-0281-6988-1, 2 pgs, May 8, 2001.

Business Wire, "Apogee Networks Announces Investment by Cisco Systems; Combined Efforts Enhance Billing Capabilities for Content Delivery Network Providers," NDN 219-0220-9035-0, 2 pgs, Jan. 23, 2001.

Business Wire, "Key Analysts Predict Content Billing is the Internet's New Frontier; Content is the Asset of the Industry; Apogee Networks Seen as the Leader in New Internet Industry Space," NDN 219-0162-6934-6, 3 pgs, Oct. 10, 2000.

Business Wire, "Apogee Networks Unveils NetCountant Wireless Billing At Supercomm; Company Demonstrates Industry First Wireless Content Usage Based Billing Solution," NDN 218-0324-8075-6, 2 pgs, Jun. 5, 2001.

Business Wire, "Apogee Networks Wins 2000 Communications ASP Product of the Year Award; Apogee Networks' NetCountant Billing Takes Top Honors for Innovative Content Usage Based Billing Solutions," NDN 218-0282-3757-7, 2 pgs, Mar. 21, 2001.

Business Wire, "Wireless Internet Content Billing and Settlement Capability Announced; Companies Announce Interoperability Between WAP Gateway and Content Billing System," NDN 218-0220-0997-2, 2 pgs, Dec. 6, 2000.

Business Wire, "Apogee Networks Joins Content Alliance; Billing Expert to Join Industry Group Aimed At Advancing Content Networking," NDN 218-0181-2716-7, 3 pgs, Oct. 11, 2000.

Business Wire, "Apogee Networks, Inc. and Paysys International, Inc. to Integrate Technologies to Create Advanced IP Content Billing Solutions," NDN 218-0098-0623-9, 3 pgs, Jun. 19, 2000.

* cited by examiner

70 — DECAPSULATION TO UP-LINK CHARGING ⟶ UP-LINK CHARGING ADDRESS (TUNNEL ID (ACCESS POINT NAME (IP PACKET)))

72 — CHARGING TO UP-LINK POLICY CONTROL ⟶ UP-LINK POLICY ADDRESS (TUNNEL ID (ACCESS POINT NAME (IP PACKET)))

74 — CHARGING TO DOWN-LINK POLICY CONTROL ⟶ DOWN-LINK POLICY CONTROL ADDRESS (ACCESS POINT NAME (IP PACKET))

76 — DOWN-LINK POLICY CONTROL TO CHARGING ⟶ DOWN-LINK CHARGING ADDRESS (TUNNEL ID (ACCESS POINT NAME (IP PACKET)))

78 — DOWN-LINK CHARGING TO TUNNEL ENCAPSULATION ⟶ TUNNEL ENCAPSULATION ADDRESS (TUNNEL ID (ACCESS POINT NAME (IP PACKET)))

*FIG. 3*

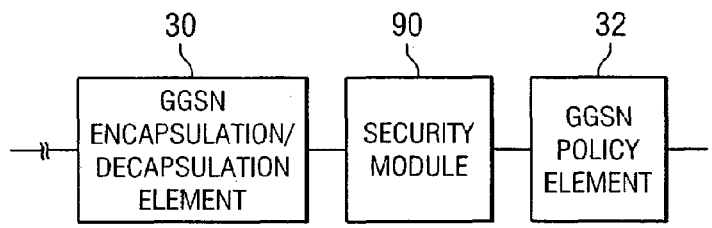

*FIG. 4A*

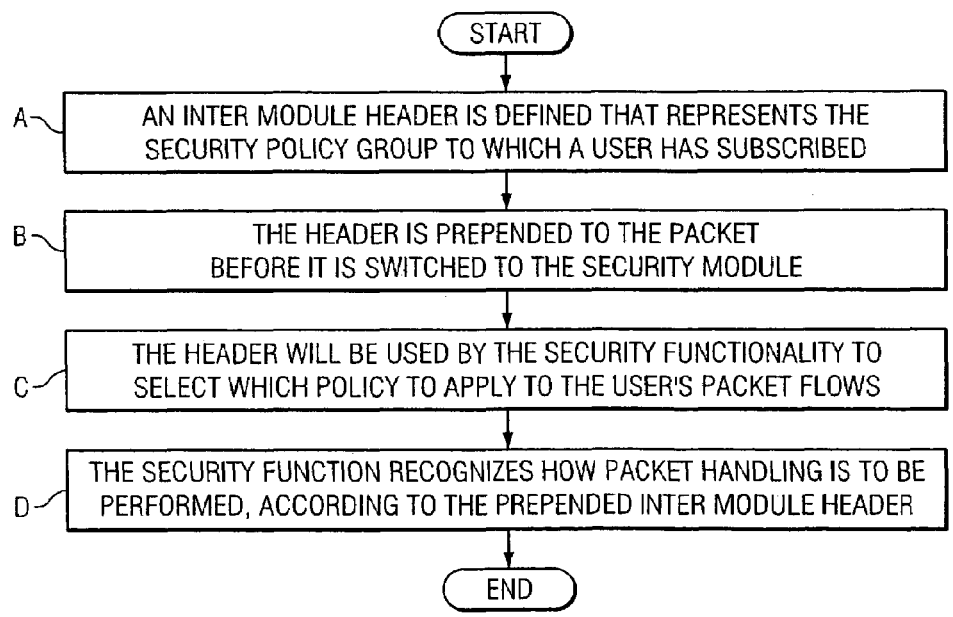

*FIG. 4B*

SYSTEM AND METHOD FOR SERVICE TAGGING FOR ENHANCED PACKET PROCESSING IN A NETWORK ENVIRONMENT

CROSS REFERENCE TO RELATED APPLICATIONS

This application is a continuation of U.S. application Ser. No. 10/959,810, filed Oct. 5, 2004, by Robert M. Broberg, Mark Grayson, Louis F. Menditto, Rafael M. Montalvo, Chris O'Rourke, Timothy P. Stammers, Marco C. Centemeri and Jayaraman R. Iyer and entitled "System and Method for Service Tagging for Enhanced Packet Processing in a Network Environment".

TECHNICAL FIELD OF THE INVENTION

This invention relates in general to the field of communications and, more particularly, to a system and a method for service tagging for enhanced packet processing in a network environment.

BACKGROUND OF THE INVENTION

Networking services have become increasingly important in today's society. One feature of networking services relates to client or source awareness. Certain services, functions, or capabilities may be provided to a group of end users or to clients based on a corresponding source profile or policy. Devices or components within a network must generally be able to identify such a profile or policy before offering selected enhanced services, functions, or capabilities to a targeted group of end users. Accordingly, sufficient information must be made available at specific times in order to allow for an accurate identification of a flow and, further, to bill for and/or process that flow accordingly.

As the subscriber base of end users increases and/or becomes mobile, proper routing and efficient management of communication sessions and data flows becomes even more critical. In some environments, policy, locale, or service level may be unknown, inaccurate, or ambiguous at various times during a communication session. This deficiency may create synchronization issues where an end user may be incorrectly billed or where other users may have access to certain information that should not be made available to them or where other users are inadvertently susceptible to hacking. Thus, the ability to properly manage policy information in a network environment, while achieving optimal policy synchronization amongst network components, whilst maintaining charging accuracy presents a significant challenge to system designers, component manufacturers, and network operators.

SUMMARY OF THE INVENTION

From the foregoing, it may be appreciated by those skilled in the art that a need has arisen for an improved communications approach that provides improved signaling for implementing policy on behalf of selected end users. In accordance with one embodiment of the present invention, a system and a method for billing and for implementing security policies in a network environment are provided that greatly reduce disadvantages and problems associated with conventional communications techniques.

According to one embodiment of the present invention, there is provided an apparatus for charging in a network environment that includes an access gateway encapsulation/decapsulation element operable to establish one or more packet data protocol (PDP) links on behalf of an end user and to perform encapsulation and decapsulation operations for one or more of the links associated with the end user. The access gateway encapsulation/decapsulation element is further operable to interface with a client services packet gateway (CSPG) that is operable to provide enhanced packet processing for the end user for requested information. The apparatus also includes an access gateway policy element operable to interface with the CSPG. The access gateway encapsulation/decapsulation element and the access gateway policy element cooperate to use one or more inter-module headers in order to coordinate the enhanced packet processing for one or more communication flows associated with the end user.

Certain embodiments of the present invention may provide a number of technical advantages. For example, according to one embodiment of the present invention, a communications approach is provided that allows for distribution of an enhanced gateway functionality in two elements that are optimized for accurate billing. Such an architecture may also provide an ideal placement of a charging functionality in any enhanced gateway system such that charging is properly executed. Further, the proffered configuration provides enhanced processing of flows generated by active charging elements in any gateway.

Another technical advantage associated with one embodiment of the present invention relates to security. The configuration of the present invention, as explained more fully below, allows for an integration of a security functionality within enhanced gateways. Thus, one example embodiment could relate to billing, but another configuration could implement similar service tagging that can be used to integrate per subscriber security into the enhanced gateway. Moreover, the present configuration may also provide the advantage of having failover scenarios with the per subscriber state being passed in-band with the packet.

Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and the features and advantages thereof, reference is made to the following description, taken in conjunction with the accompanying figures, wherein like reference numerals represent like parts, in which:

FIG. 3 is a simplified schematic diagram that provides a summary of headers between elements that may be included in the communication system;

FIG. 4A is a simplified block diagram of an alternative embodiment of the present invention that is associated with security; and FIG. 4B is an example overview of a method associated with the alternative embodiment of FIG. 4A.

DETAILED DESCRIPTION OF EXAMPLE EMBODIMENTS

Figure 1:
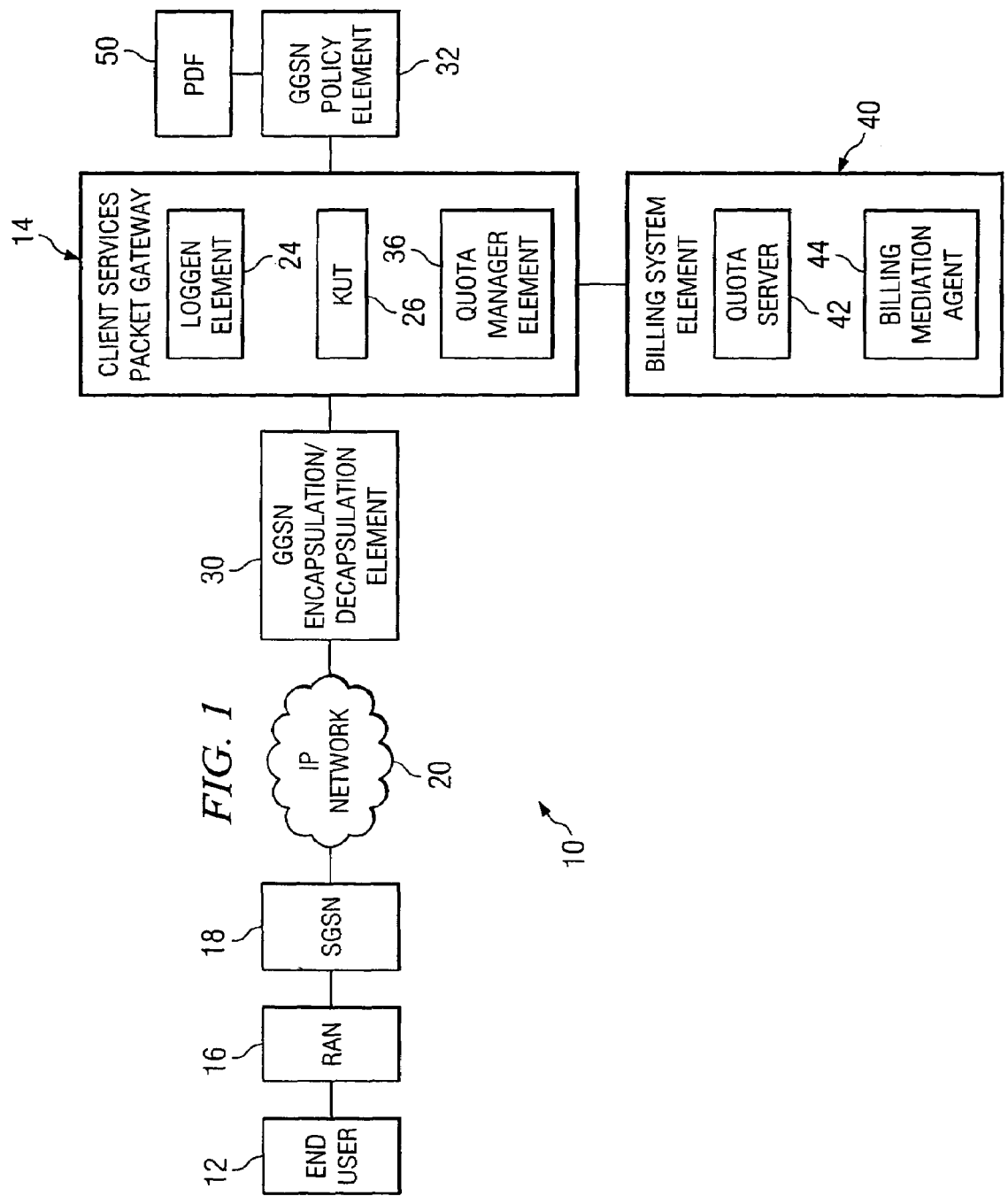
FIG. 1 is a simplified block diagram of a communications system for service tagging for billing in a network environment in accordance with one embodiment of the present invention.

FIG. 1 is a simplified block diagram of a communication system 10 for providing enhanced packet processing (e.g. for purposes of security or billing) in a network environment. Communication system 10 includes an end user 12, a radio access network (RAN) 16, a serving general packet radio service (GPRS) support node (SGSN) 18, and an internet protocol (IP) network 20. Additionally, communication system 10 includes a gateway GPRS support node (GGSN) encapsulation/decapsulation element 30, a GGSN policy element 32, and a client services packet gateway (CSPG) 14. GGSN policy element 32 may be coupled to a policy decision function (PDF) 50. In addition, CSPG 14 may include a loggen element 24, a known user table (KUT) 26, and a quota manager element 36. Communication system 10 may additionally include a billing system element 40 that may include a quota server 42 and a billing mediation agent (BMA) 44.

FIG. 1 may be generally configured or arranged to represent 2.5G communication architecture applicable to a Global System for Mobile (GSM) environment in accordance with a particular embodiment of the present invention. However, the 2.5G architecture is offered for purposes of example only and may alternatively be substituted with any suitable networking protocol or arrangement that provides a communicative platform for communication system 10. For example, communication system 10 may cooperate with any version of a GPRS tunneling protocol (GTP) that could benefit from a billing function being provided for any network element. This may be inclusive of first generation, 2G, and 3G architectures that provide features and services for any end user 12. Moreover, communication system 10 could be applied to any access network/protocol that allows end user 12 to create sub-connections, which specify differential treatment for packets in those connections. Furthermore, the relaying of such information into one or more CSPG devices could be implemented in any such network/access technology.

In accordance with the teachings of the present invention, communication system 10 provides multiple inter-module headers that are used to permit the distribution of a charging functionality within an enhanced gateway (i.e. a given GGSN may be separated into two components that straddle CSPG 14 and that relate to charging). Inter-module headers are used to pass access point name (APN) and tunnel ID information between individual modules within the enhanced gateway (i.e. CSPG 14). Inter-module headers are also used to ensure locally generated charging IP packets are routed correctly through downlink policy control in order to determine whether packets should be dropped and, if permitted, which downlink tunnel should be used to transport the charging packet. In addition, inter-module headers may be used to integrate a security functionality into enhanced gateways. Additionally, inter-module headers are used to support failover scenarios in certain elements. This can be done because state information is passed in-band with the packet.

For purposes of teaching and discussion, it is useful to provide some overview as to the way in which the following invention operates. The following foundational information may be viewed as a basis from which the present invention may be properly explained. Such information is offered earnestly for purposes of explanation and discussion only and, accordingly, should not be construed in any way to limit the broad scope of the present invention and its potential applications.

Access gateways (such as a given GGSN) generally provide network access to end users 12 (e.g. mobile stations) by terminating GTP tunnels initiated by SGSN 18. Version 1.0 of the GTP protocol allows mobile stations to open multiple packet data protocols (PDPs) within these GTP tunnels. The secondary PDPs are sub-tunnels intended to be used to provide differentiated quality of service (QoS) for traffic flowing through them.

Thus, a GGSN can generally provide network access to end user 12 (e.g. via a mobile station) by terminating GTP tunnels initiated by SGSN 18. The GTP protocol may allow mobile stations to open multiple PDPs within these GTP tunnels. When opening a secondary PDP, a mobile station can specify a traffic flow template (TFT) that defines the traffic pattern, which in turn governs the treatment of traffic that the mobile station will receive through this PDP. The TFT may define, for example, the L3-L4 information (IP address and ports) as well as a desired QoS for this traffic pattern.

The TFT information (or any significant portion thereof) may be stored in a GGSN to offer per-PDP QoS to the mobile station (i.e. end user 12). The GGSN may be configured to relay the TFT information into backend flows (e.g. RADIUS, terminal access controller access system (TACACS), DIAMETER, and GTP') to other interested network elements. The TFT information element may consist of source/destination IP addresses, source/destination ports, a protocol identifier, an IPSec security parameter index, a type of service/traffic class, etc. This allows other network elements that are gathering information (via RADIUS proxy or a GTP' interface to the GGSN) to properly classify and provide differentiated services to traffic on each secondary PDP.

An example of such a service to be provided is differentiated billing. Consider a case where end user 12 opens two PDPs, one for basic internet connectivity and the other with a higher QoS for a voice application. Downstream service gateways could bill the voice application at a higher rate. This could be accomplished by matching user traffic to a TFT-defined L4 profile learned by an interested service gateway via (for example) RADIUS or GTP'. Thus, a GGSN is equipped to relay the TFT traffic profile data (i.e. traffic pattern information) associated with secondary PDPs through its control path interfaces (GTP', RADIUS, etc). This enables interested service gateways in the control path (e.g. CSPG 14) to deliver per-PDP differentiated services. The GGSN adds TFT profile information to the GTP' and RADIUS interfaces. CSPG 14 could then begin parsing this info and begin applying differentiated services per-PDP. In an implementation of charging, it is important that a bearer flow billing functionality does not account for (downlink) packets, which are subsequently dropped at the GGSN (i.e. due to the operation of such policy controlled gating functionality).

Note that usage of the term "access gateway" in this document refers to GGSN encapsulation/decapsulation element 30 and/or GGSN policy element 32 in one example, but could include any number of additional terms that can be included in a broad definition of an access gateway (e.g., a network access server (NAS)). In addition, the term "charging" refers to any element associated with billing or accounting. This broad term encompasses such elements, as well as additional objects (e.g., crediting or debiting) where appropriate.

In particular, communication system 10 relates a scenario in which the charging functionality is implemented in a separate component, which can be independent of the traditional gateway functionality. This will frequently be the case as the charging functionality may require dedicated application specific integrated circuits (ASICs) for performing deep packet inspection, as compared to the more generic functionality provided by other gateway elements.

The policy that is to be implemented in the gateway element will frequently be defined to silently discard packets that are out of contract. This contract may be statically defined for a particular user or for a set of users and be set according to subscription. Further, this contract may be dynamically negotiated at session establishment (e.g., using 3GPP QoS negotiation and TFT definition) or dynamically controlled throughout the duration of the session, e.g., using 3GPP context modification procedures and/or COPS-PR control.

The charging functionality should not be counting packets that will be subsequently dropped by the gateway element. When the charging functionality is further analyzed, one particular approach to deliver charging functionality is to terminate TCP and to perform a "half proxy" functionality, whereby (for example) hypertext transfer protocol (HTTP) requests can be intercepted by the charging function and quota server 42 can then determine how to process the flow. For example, if quota server 42 replies that insufficient quota is available, the charging function can reply with a HTTP 302 message that redirects the user.

Communication system 10 overcomes a number of existing network deficiencies in order to provide a platform that relates to the integration of a charging functionality that includes TCP termination functionality in CSPG 14. Similar concepts can be applied to other access technologies, e.g., integrated charging for digital subscriber line (DSL) access, a cable modem termination system (CMTS) for cable modem access, a packet data serving node (PDSN) for code division multiple access (CDMA) access, or a home agent configuration for mobile IP services.

Note that it is a prerequisite that downlink packets are not charged to an end user (or to their account) and then subsequently dropped by the access gateway. The charging function for the downlink is generally executed after any policy control functionality is performed. The following is the chaining of service for downlink flows: downlink interface, GGSN policy element 32 (e.g., per user policy), charging function, tunnel encapsulation and then to the end user (via one or more tunnels). For the up-link arrangement, the placement of the charging function may be chosen to dissuade users from trying to circumvent policy control. In this manner, end user 12 would be penalized for sending out of contract packets.

The following is the chaining for up-link flows: end user (via one or more tunnels), tunnel decapsulation, charging function (e.g. per user policy), and then to an up-link interface. As is illustrated in FIG. 1, a given GGSN has been deconstructed in communication system 10, whereby the charging function (CSPG 14) is positioned between the tunnel encapsulation/decapsulation function (GGSN encapsulation/decapsulation element 30) and the policy function (GGSN policy element 32). Note that in the downlink direction the active charging element will be generating packets. This could translate into, for example, terminating TCP and potentially replying with HTTP 302 redirection messages. The downlink messages should pass through the per user policy function in order to establish: 1) whether the downlink packet matches a defined access control list (either static or dynamic); and 2) (in the case of GPRS) which downlink tunnel is used to transport the packet generated by the active charging element. In the context of GPRS, the TFT is generally user defined and, thus, it cannot be assumed that a flow uses a single tunnel and that the up-link TCP SYN will use the same tunnel as the downlink TCP SYN/ACK. In both cases, it is evident that the reverse packet should traverse the downlink policy function. Details relating to specific implementations of such signaling are provided below with reference to the flowchart of FIG. 2.

Referring back to FIG. 1, end user 12 is a client or a customer wishing to initiate a communication session or a data flow in communication system 10 via IP network 20. End user 12 may be inclusive of devices used to initiate a communication, such as a computer, a personal digital assistant (PDA), a laptop or an electronic notebook, a telephone, a mobile station, or any other device, component, element, or object capable of initiating voice or data exchanges within communication system 10. End user 12 may also be inclusive of a suitable interface to the human user, such as a microphone, a display, a keyboard, or other terminal equipment (such as for example an interface to a personal computer or to a facsimile machine in cases where end user 12 is used as a modem). End user 12 may also be any device that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

RAN 16 is a communications interface between end user 12 and SGSN 18. RAN 16 may comprise a base transceiver station and a base station controller. The communications interface provided by RAN 16 offers connectivity and allows data to be exchanged between end user 12 and any number of selected elements within communication system 10. RAN 16 facilitates the delivery of a request packet generated by end user 12 and the reception of information sought by end user 12. RAN 16 is only one example of a communications interface between end user 12 and SGSN 18. Other types of communications interfaces may be used for a desired network design based on particular needs.

IP network 20 represents a series of points or nodes of interconnected communication paths for receiving and transmitting packets of information that propagate through communication system 10. IP network 20 offers a communicative interface between end user 12 and an access gateway (e.g. a GGSN) and may be any local area network (LAN), wireless local area network (WLAN), metropolitan area network (MAN), wide area network (WAN), virtual private network (VPN), or any other appropriate architecture or system that facilitates communications in a network environment. IP network 20 implements a user datagram protocol (UDP)/internet protocol (UDP/IP) communication language protocol in a particular embodiment of the present invention. However, IP network 20 may alternatively implement any other suitable communication protocol for transmitting and receiving data or information within communication system 10.

SGSN 18, GGSN encapsulation/decapsulation element 30, and GGSN policy element 32 are network elements that cooperate in order to facilitate a communication session involving end user 12. GGSN encapsulation/decapsulation element 30 and GGSN policy element 32 are network nodes that may be working in conjunction with multiple SGSNs 18 to provide a communications medium in a GPRS service network environment. GPRS represents a packet-based data bearer service for communication services that may be delivered as a network overlay for any type of suitable network configuration or platform. GPRS generally applies packet-radio and packet switching principles to transfer data packets in an efficient way between GSM elements or units and external packet data networks. GPRS may support multiple internet communication protocols and may enable existing IP, X.25, frame relay, or any other suitable applications or platforms to operate over GSM connections.

Note that because certain enhancements should be made to several network components to achieve the targeted signaling of the present invention, it is critical to explain their internal structures. In a particular embodiment of the present invention, GGSN encapsulation/decapsulation element 30, a GGSN policy element 32, and/or CSPG 14 include software that is operable to facilitate appropriate signaling for service tagging for purposes of charging or for purposes of providing security in a network environment. The augmentation or enhancement may be provided in just one of these elements, two elements, or in all three elements. Such design choices may be based on particular networking or configuration needs. Alternatively, this signaling capability may be provided by any suitable hardware, component, device, ASIC, field-programmable gate array (FPGA), micro-processor, read only memory (ROM) element, random access memory (RAM) element, erasable programmable ROM (EPROM), electrically erasable programmable ROM (EEPROM), processor, algorithm, element or object that is operable to perform such operations. Note that such a signaling functionality may be provided external to the GGSN components and/or CSPG 14, allowing appropriate accounting to be achieved for interested components in the network.

CSPG 14 is an accounting element that also represents a client-aware device, which may provide or offer some service or feature to end user 12. Such services may be based on an effective mapping between a source IP address of a given request packet and a user profile. Client-aware devices may key off the source IP address in providing services to end user 12. There are a number of reasons why a device or a component would want to identify end user 12. For example, some devices may wish to identify end user 12 for authorization or quality of service purposes. In another example, a device may wish to maintain user profiles to provide for accounting records (for example per-user accounting) or to provide for content billing operations. Alternatively, a device or a component may use an identification to provide for any other type of suitable client-aware service, tool, or feature according to the particular needs of network components or equipment. Additional services may be related to areas such as routing, security, accounting, firewalling, intrusion detection, intrusion prevention, filtering, or any other suitable parameters or policies where user-aware characteristics serve as a basis for service implementation.

CSPG 14 represents a generic piece of network equipment that can facilitate some type of accounting service for communication system 10. CSPG 14 could be a wireless application protocol (WAP) gateway, a compression and/or optimization engine, a billing engine (inclusive of per-content billing), a service enforcement element, a content authorization component, a policy enforcement gateway, or any other element that is operable to modify, process, or transform data or information in a network environment. This may be inclusive of simple routers, switches, loadbalancers, gateways, bridges, or any other piece of network equipment where appropriate and based on particular needs. CSPG 14 represents any component, device, element, or object that can benefit from having suitable signaling information provided to it such that appropriate billing may be achieved.

As described above, CSPG 14 utilizes the identity of the client or the end user to provide services based on a source profile. In a particular embodiment of the present invention, CSPG 14 provides client-aware services by operating at networking layers two and three. Accordingly, the information available at networking layers two and three provides a basis for the identification of an end user or a client. CSPG 14 may use an IP address or any other suitable parameter to uniquely identify a client or an end user in offering a service, enhanced capability, or feature to an end user. CSPG 14 may include any suitable hardware, software, components, or elements that identify a unique identifier in order to provide some networking feature or capability to an end user.

CSPG 14 may be inserted into a data flow that may view, extract, identify, access, or otherwise monitor information included within the data flow. CSPG 14 may handle the enforcement of access, quota distribution, and accounting that is provided by the information retrieved from elements included within billing system element 40. CSPG 14 may generally deduct quota after it has been properly allocated and, subsequently, retrieve additional quota when that quota allocation has been consumed. In a general sense, CSPG 14 may be responsible for quota enforcement for end user 12.

In operation of an example embodiment, CSPG 14 may extract IP source address information associated with end user 12. The IP source address may be used to determine an identity (or profile) of end user 12 that may be stored in KUT 26. Alternatively, CSPG 14 may extract or identify any information within the data flow that provides a correlation between end user 12 and a given data flow. CSPG 14 may also be a client-aware device that provides or offers some service or feature to end user 12. Such services may be based on an effective mapping between a source IP address of a given address packet and a user profile or information associated with end user 12. CSPG 14 may utilize a source IP address in providing services or features to end user 12. CSPG 14 may include a RADIUS component that may receive RADIUS updates and parse the updates. In addition, CSPG 14 may execute some action based on the RADIUS updates it receives. CSPG 14 may be provided with accounting, authorization, and authentication (AAA) capabilities where appropriate. Alternatively, these capabilities may be provided external to CSPG 14, for example, in a AAA server.

There are other reasons why a device or a component may seek to identify the source (end user 12) associated with a communication session or data flow. For example, some devices may wish to identify end user 12 for authorization purposes. In another example, a device may wish to maintain user profiles for billing or accounting records (for example, in conjunction with per-user accounting) or to provide for content billing information. Alternatively, a device or a component may use the identification of end user 12 to provide for any other type of suitable client-aware service, tool, or feature according to the particular needs of network operators. Additional services may be related to areas such as routing, permissions or access-granting mechanisms, priority, QoS, firewalling, intrusion detection and/or prevention, content filtering, or any other suitable parameters or policies where user-aware characteristics serve as a basis for a network service implementation.

Loggen element 24 is a storage element operable to build billing records and to communicate the billing records to BMA 44 based on information provided by KUT 26. Even in cases where the information returned by KUT 26 reflects a null (e.g., no active BMA), this may still be used to determine the destination and queue(s) to use or to invoke for a corresponding billing record. Loggen element 24 may also operate to store data for later use and execute all formatting for billing records to be communicated to BMA 44. Loggen element 24 may be implemented using hardware, software, or any other suitable element or object operable to store information and to generate a billing record to be communicated to BMA 44. Loggen element 24 may communicate with BMA 44 in order to log quota usage data associated with end user 12. Loggen element 24 may generate logging records or billing records and additionally send messages to billing system element 40 associated with a change in SGSN.

KUT 26 is a data storage element that manages one or more correlations between the ID of end user 12 and a corresponding IP address. KUT 26 may also store information relating to BMA 44, previously designated to end user 12, and BMA 44 may be invoked when additional information associated with end user 12 is communicated to CSPG 14. KUT 26 may be consulted as additional billing records are created in order to determine that BMA 44 should receive selected billing records. KUT 26 may also include an application program interface (API) that may be implemented in order to obtain user ID information for an IP address from a data flow.

Quota manager element 36 is an element that manages quota information for services subscribed to by end user 12. Quota manager element 36 also provides an interface between GGSN elements and billing system element 40 and may receive a communication that indicates a change in locale, e.g., corresponding to a change in SGSN 18. Quota manager element 36 may also identify new and old identifiers or pointers for selected locales involved in the communication session and notify billing system element 40. Quota manager element 36 may also communicate with billing system element 40 in order to exchange information associated with funding for end user 12. Quota manager element 36 may also receive RADIUS updates from a GGSN that reflect the status associated with end user 12.

Billing system element 40 is an object that manages the billing and access policies associated with a given end user 12. In one embodiment, billing system element 40 includes quota server 42 and BMA 44. CSPG 14 may communicate with billing system element 40 in order to retrieve information or to learn of billing policies for end user 12. BMA 44 coordinates billing records and quota server 42 can be used to debit a selected amount of quota from an end user account.

It is critical to note that billing system element 40 (and its internal components such as quota server 42) may include any suitable elements, hardware, software, objects, or components capable of effecting their operations or additional operations where appropriate. Additionally, any one or more of the elements included in CSPG 14 and billing system element 40 may be provided in an external structure or combined into a single module or device where appropriate. Moreover, any of the functions provided by these two elements may be offered in a single unit or single functionalities may be arbitrarily swapped between CSPG 14 and billing system element 40. The embodiment offered in FIG. 1 has been provided for purposes of example only. The arrangement of elements (and their associated operation(s)) may be reconfigured significantly in any other appropriate manner in accordance with the teachings of the present invention.

PDF 50 is a logical policy decision element that can use standard IP mechanisms to implement a communications protocol in the IP bearer layer. These mechanisms may be conformant to, for example, the framework defined in IETF [RFC 2753], where PDF 50 is effectively representing a policy decision point. PDF 50 can make decisions using policy rules.

Figure 2:
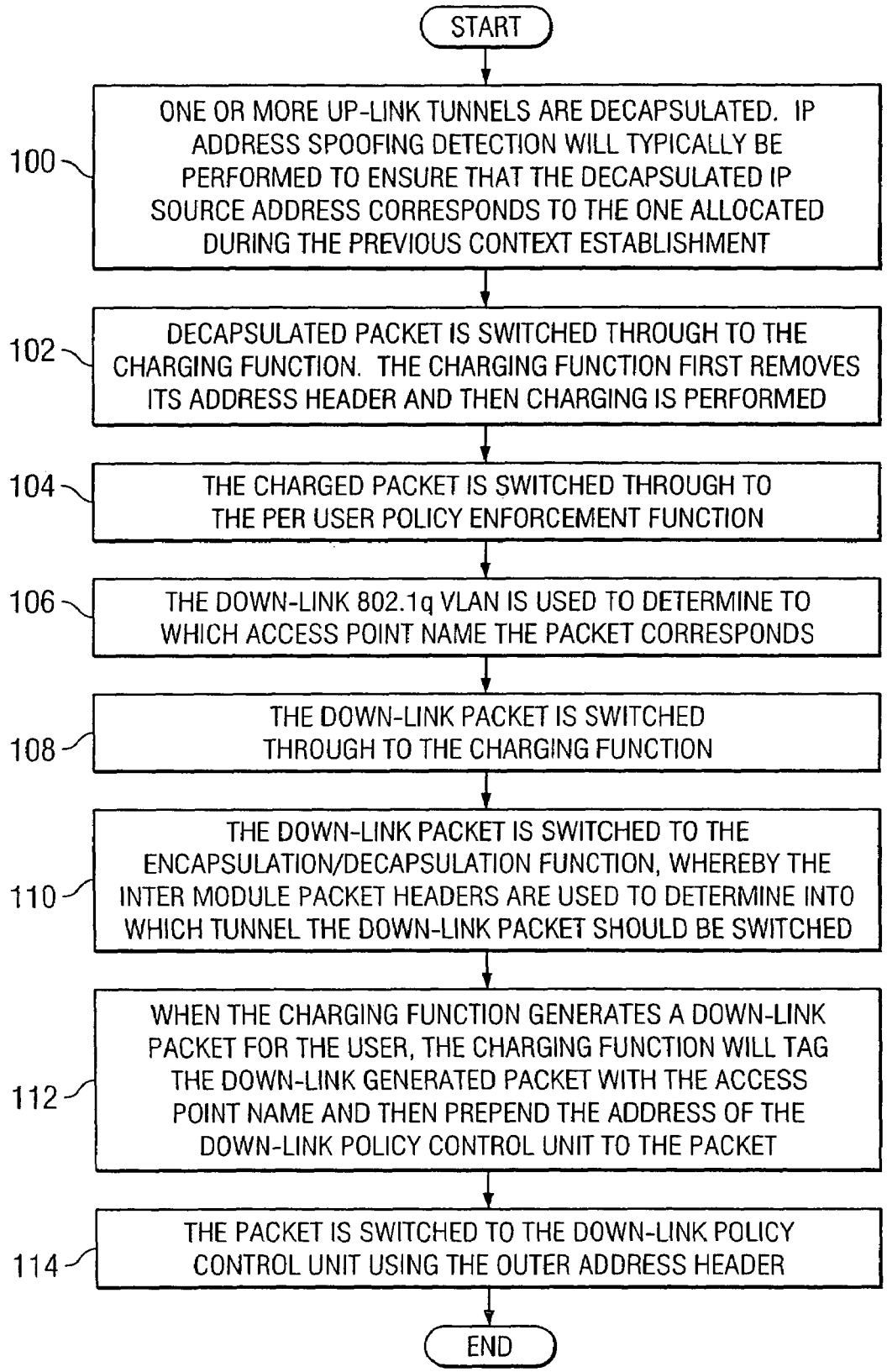
FIG. 2 is a simplified flowchart that illustrates an example implementation and operation of the communication system.

FIG. 2 is a simplified flowchart that illustrates an example implementation of communication system 10. The method begins at step 100, where one or more up-link tunnels may be decapsulated. IP address spoofing detection may be performed to ensure that the decapsulated IP source address corresponds to the one allocated during the previous context establishment. The selected tunnel (amongst a plurality of tunnels) may affect policy control and charging. Thus, the decapsulated packet is first tagged with an inter-module packet header corresponding to the tunnel identity. In addition, to accommodate overlapping IP address allocation, an identifier corresponding to the routing domain (also referred to as an APN in GPRS) is prepended as a second inter-module packet header. The final tag added corresponds to the address of the up-link charging function that enables proper switching of the packet.

In step 102, the decapsulated packet (after having been suitably tagged) is switched through to the charging function (i.e. CSPG 14). The charging function first removes its address header and then charging is performed, whereby the remaining tags of the packet can be used in the quota request to indicate to quota server 42: 1) which tunnel was used in sending the packet; and 2) to which APN the packet corresponds. Following charging, the packet may be tagged with the address of the up-link policy control unit, which enables proper switching of the packet within the enhanced gateway.

In step 104, the charged packet is switched through to the per user policy enforcement function (i.e. GGSN policy element 32). GGSN policy element 32 first removes its address header and then uses the remaining tags corresponding to the tunnel identifier and the APN (i.e. the routing domain) to perform per packet policy enforcement. This may entail matching the packet against defined access control lists and real-time gating control in order to determine whether to pass or to discard the packet.

Finally, the APN header is used to determine the VPN routing and forwarding (VRF) element for switching the up-link packet. The VRF element reflects a routing table for connecting a set of sites to a VPN service. A VRF includes a template of a VPN routing/forwarding table that may be included in a given network device (e.g. a router). The inter-module packet headers are removed and the VRF is used to determine, e.g., which 802.1q tag is used to egress the packet from the enhanced gateway. In the downlink direction, the processing is simply reversed.

In step 106, the downlink 802.1q VLAN is used to determine to which APN the packet corresponds. The destination address of the IP packet (together with the APN) is used to index the policy control function and to identify how the packet is to be handled. Per subscriber policy control is indexed based on APN and IP address and, further, allows static and dynamic policy control to be determined. In addition, when a plurality of tunnels has been established, the traffic flow template may be used to determine to which tunnel the packet corresponds. After a policy control has been applied, the packet is tagged with an inter-module packet header, which corresponds to the tunnel identifier and the APN information. The final prepended inter-module packet header corresponds to the address of the downlink charging function.

In step 108, the downlink packet (suitably tagged) is switched through to the charging function. The charging function first removes its address header and then charging is performed, whereby the remaining tags of the packet can be used in the quota request to indicate to quota server 42: 1) which tunnel was used in sending the packet; and 2) to which APN the packet corresponds. Following charging, the packet is tagged with the address of the encapsulation/decapsulation function, which enables proper switching of the packet within the enhanced gateway (i.e. CSPG 14).

In step 110, the downlink packet is switched to the encapsulation/decapsulation function, whereby the inter-module packet headers are used to determine to which tunnel the downlink packet should be switched. As is evident, the described use of inter-module packet headers has allowed the integration of the charging function within an enhanced gateway. In order to accommodate active charging, whereby the charging function terminates TCP, the following step is defined. In Step 112, when the charging function generates a downlink packet for the user, e.g., when it responds to a TCP SYN with a TCP SYN/ACK, the charging function will tag the downlink-generated packet with the APN and then prepend the address of the downlink policy control unit to the packet.

In step 114, the packet is switched to the downlink policy control unit using the outer address header. The downlink policy control unit will strip its address and then use the APN header to determine to which APN the packet corresponds. The destination address of the IP packet (together with the APN) is used to index the policy control function and to determine how the packet is handled. Per subscriber policy control is indexed based on APN and IP address. In addition, when a plurality of tunnels has been established, the traffic flow template is used to determine to which tunnel the packet corresponds. After a policy control has been applied, the packet is tagged with an inter-module packet header that corresponds to the tunnel identifier and the APN information. The final prepended inter-module packet header corresponds to the address of the downlink charging function.

It is critical to note that some of the steps illustrated in FIG. 2 may be changed or deleted where appropriate and additional steps may also be added to the flowcharts. These changes may be based on specific communication architectures or particular interfacing arrangements and configurations of associated elements and do not depart from the scope or the teachings of the present invention. The interactions and operations of the elements within communication system 10, as disclosed in FIG. 2, have provided merely one example for their potential applications. Numerous other applications may be equally beneficial and selected based on particular networking needs.

FIG. 3 is a simplified schematic diagram that provides a summary of the inter-module headers between network elements that may be included in communication system 10. The headers between the network elements include: an element 70, which includes a decapsulation to up-link charging that corresponds to an up-link charging address (tunnel ID (APN (IP packet))); an element 72, which includes charging to up-link policy control that corresponds to an up-link policy address (tunnel ID (APN (IP packet))); an element 74, which includes a charging to down-link policy control that corresponds to a down-link policy control address (APN (IP Packet)); an element 76, which includes a down-link policy control to charging that corresponds to a down-link charging address (tunnel ID (APN (IP Packet))); and an element 78, which includes a down-link charging to tunnel encapsulation that corresponds to a tunnel encapsulation address (tunnel ID (APN (IP Packet))).

FIG. 4A is a simplified block diagram of an alternative embodiment of the present invention that relates to security. In addition, FIG. 4B is an example overview of a method associated with the alternative embodiment of FIG. 4A. These two FIGURES may be reviewed together, as FIG. 4B offers an example flow associated with the configuration of FIG. 4A. Note that FIG. 4B provides a simplistic synopsis of how such a security protocol may be used in conjunction with the teachings of the present invention. The illustrated steps may be supplemented with any appropriate additional steps where appropriate and based on particular needs.

The previous examples discussed above (in the context of FIGS. 1-3) relate to charging. However, similar service tagging can be used to integrate per subscriber security into an enhanced gateway. In a security implementation, an inter-module header may be defined that represents the security policy group to which a user has subscribed. This is reflected by Step A. This will be prepended to the packet before it is switched to a security module 90 (of FIG. 4A), as illustrated by Step B. Security module 90 can be part of CSPG 14 or be provided as an independent unit that addresses network security for end user 12. The inter-module header will be used by the security functionality to select the policy to apply to the user's packet flows, as reflected by Step C. For example a subscriber may subscribe to one out of ten security options: with option one corresponding to intrusion detection and prevention, option two corresponding to detection only, option three corresponding to no security options, etc. Security module 90 will then be able to know how packet handling is to be performed (according to the prepended inter-module header) without having to build its own subscriber state. This operation is reflected by Step D.

Note that security module 90 may include software operable to interface appropriately with GGSN encapsulation/decapsulation element 30 and GGSN policy element 32. Alternatively, such a functionality may be achieved by any suitable hardware, component, device, ASIC, FPGA, microprocessor, EPROM, EEPROM, processor, algorithm, element or object that is operable to perform such operations. Such a module may also be provided in any other suitable network component in cases where it is not provided as its own separate component.

Although the present invention has been described in detail with reference to particular embodiments, it should be understood that various other changes, substitutions, and alterations may be made hereto without departing from the spirit and scope of the present invention. For example, although the present invention has been described as operating in a GGSN environment, the present invention may be used in any networking environment that provides some type of accounting for end user 12. The signaling protocol disclosed in the preceding figures is generally applicable to all communication systems in which information packets are routed between or through IP networks.

Note also that although specific protocols are described herein in this document to illustrate example operations, any suitable communicative platforms may be used to effectuate the operations, which provide appropriate signaling for communication system 10. Elements may relay signaling information to other network elements via any suitable backend control protocol (e.g. GTP', RADIUS, DIAMETER, TACACS, etc.).

It is also important to note that the teachings of the present invention may be readily imparted to an end user (or a group of end users) such that the end user may sign up for (or enlist or enroll in) a charging plan that includes the operations and functions described herein. Thus, an end user could be enrolled in a charging plan that utilizes service tagging in order to achieve appropriate charging in a network environment. A corresponding bill may subsequently be generated that reflects such an arrangement. Such an arrangement may be reflected by a simple customer arrangement between a service provider and a client. In a similar fashion, an end user could be enrolled in a security policy plan, whereby similar subscribing occurs and billing ensues. The present invention is replete with such financial arrangements and readily encompasses all such possibilities.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 0.35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus for enhanced packet processing in a network environment, comprising:
   an access gateway encapsulation/decapsulation element operable to:
      establish one or more packet data protocol (PDP) links on behalf of an end user;
      perform encapsulation and decapsulation operations on a plurality of packets of the links;
      tag the packets with one or more inter-module packet headers, an inter-module packet header representing a security policy group to which the end-user has subscribed, the security policy group comprising a plurality of end users to which a service is provided according to a policy; and
      interface with a security module that is operable to receive the packets and select a policy based on the security policy group represented by the inter-module packet header; and
   an access gateway policy element distinct from the encapsulation/decapsulation element and operable to:
      receive the packets from the security module; and
      perform policy enforcement according to the selected policy, the security module disposed between the access gateway encapsulation/decapsulation element and the access gateway policy element.

2. The apparatus of claim 1, wherein one or more of the one or more inter-module headers are used to pass routing domain and tunnel ID information associated with one or more of the flows from the access gateway encapsulation/decapsulation element to the security module.

3. The apparatus of claim 2, wherein the routing domain information corresponds to an Access Point Name.

4. The apparatus of claim 1, wherein a selected one of the inter-module headers are prepended to a packet before being delivered to the security module.

5. The apparatus of claim 1, wherein the access gateway encapsulation/decapsulation element and the access gateway policy element are general packet radio service (GPRS) network elements.

6. The apparatus of claim 1, wherein the security policy corresponds to one or more security options, and wherein one or more of the security options relate to a selected one of a group of security operations, the group consisting of:
   a) an intrusion detection and intrusion prevention option;
   b) an intrusion prevention only option; and
   c) a no security option.

7. The apparatus of claim 1, wherein the access gateway encapsulation/decapsulation element and the access gateway policy element are used to manage access for the end user in a selected one of a group of environments, the group consisting of:
   a) digital subscriber line environment;
   b) cable model termination system environment;
   c) a packet data serving node (PDSN) for code division multiple access (CDMA) environment; and
   d) a home agent environment for mobile IP services.

8. A method for enhanced packet processing in a network environment, comprising:
   establishing, by an access gateway encapsulation/decapsulation element, one or more packet data protocol (PDP) links on behalf of an end user;
   performing encapsulation and decapsulation operations on a plurality of packets of the links;
   tagging the packets with one or more inter-module packet headers, an inter-module packet header representing a security policy group to which the end-user has subscribed, the security policy group comprising a plurality of end users to which a service is provided according to a policy;
   interfacing with a security module that is operable to receive the packets and select a policy based on the security policy group represented by the inter-module packet header;
   receiving, by an access gateway policy element distinct from the encapsulation/decapsulation element, the packets from the security module; and
   performing policy enforcement according to the selected policy, the security module disposed between the access gateway encapsulation/decapsulation element and the access gateway policy element.

9. The method of claim 8, wherein one or more of the inter-module headers are used to pass access point name (APN) and tunnel ID information associated with one or more of the flows to the security module.

10. The method of claim 8, wherein one or more of the inter-module headers are used to ensure locally generated packets are routed through a down-link policy control in order to determine whether one or more of the locally generated packets should be dropped.

11. The method of claim 8, further comprising:
   managing access for the end user in a selected one of a group of environments, the group consisting of:
   a) digital subscriber line environment;
   b) cable model termination system environment;
   c) a packet data serving node (PDSN) for code division multiple access (CDMA) environment; and
   d) a home agent environment for mobile IP services.

12. A system for enhanced packet processing in a network environment, comprising:
   means for establishing, by an access gateway encapsulation/decapsulation element, one or more packet data protocol (PDP) links on behalf of an end user;
   means for performing encapsulation and decapsulation operations on a plurality of packets of the links;
   means for tagging the packets with one or more inter-module packet headers, an inter-module packet header representing a security policy group to which the end-user has subscribed, the security policy group comprising a plurality of end users to which a service is provided according to a policy;
   means for interfacing with a security module that is operable to receive the packets and select a policy based on the security policy group represented by the inter-module packet header;

means for receiving, by an access gateway policy element distinct from the encapsulation/decapsulation element, the packets from the security module; and means for performing policy enforcement according to the selected policy, the security module disposed between the access gateway encapsulation/decapsulation element and the access gateway policy element.

13. system of claim 12, wherein one or more of the inter-module headers are used to pass access point name (APN) and tunnel ID information associated with one or more of the flows to the security module.

14. system of claim 12, wherein one or more of the inter-module headers are used to ensure locally generated packets are routed through a down-link policy control in order to determine whether one or more of the locally generated packets should be dropped.

15. A computer readable medium comprising computer code such that when executed is operable to:
  establish, by an access gateway encapsulation/decapsulation element, one or more packet data protocol (PDP) links on behalf of an end user;
  perform encapsulation and decapsulation operations on a plurality of packets of the links;
  tag the packets with one or more inter-module packet headers, an inter-module packet header representing a security policy group to which the end-user has subscribed, the security policy group comprising a plurality of end users to which a service is provided according to a policy;
  interface with a security module that is operable to receive the packets and select a policy based on the security policy group represented by the inter-module packet header;
  receive, by an access gateway policy element distinct from the encapsulation/decapsulation element, the packets from the security module; and
  perform policy enforcement according to the selected policy, the security module disposed between the access gateway encapsulation/decapsulation element and the access gateway policy element.

16. The medium of claim 15, wherein one or more of the inter-module headers are used to pass access point name (APN) and tunnel ID information associated with one or more of the flows to the security module.

17. The medium of claim 15, wherein one or more of the inter-module headers are used to ensure locally generated packets are routed through a down-link policy control in order to determine whether one or more of the locally generated packets should be dropped.

18. A method for signing up an end user in a network environment, comprising:
  enrolling an end user in a security policy plan;
  generating a bill for the end user that corresponds to the security policy plan, wherein the security policy plan is based on a plurality of operations that include:
    establishing, by an access gateway encapsulation/decapsulation element, one or more packet data protocol (PDP) links on behalf of an end user;
    performing encapsulation and decapsulation operations on a plurality of packets of the links;
    tagging the packets with one or more inter-module packet headers, an inter-module packet header representing a security policy group to which the end-user has subscribed, the security policy group comprising a plurality of end users to which a service is provided according to a policy;
    interfacing with a security module that is operable to receive the packets and select a policy based on the security policy group represented by the inter-module packet header;
    receiving, by an access gateway policy element distinct from the encapsulation/decapsulation element, the packets from the security module; and
    performing policy enforcement according to the selected policy, the security module disposed between the access gateway encapsulation/decapsulation element and the access gateway policy element.

19. The method of claim 18, wherein one or more of the inter-module headers are used to pass access point name (APN) and tunnel ID information associated with one or more of the flows to the security module.

20. The method of claim 18, wherein one or more of the inter-module headers are used to ensure locally generated packets are routed through a down-link policy control in order to determine whether one or more of the locally generated packets should be dropped.

21. The method of claim 18, wherein the security policy plan corresponds to one or more security options, and wherein one or more of the security options relate to a selected one of a group of security options, the group consisting of:
  a) an intrusion detection and intrusion prevention option;
  b) an intrusion prevention only option; and
  c) a no security option.

22. The method of claim 18, further comprising:
  managing access for the end user in a selected one of a group of environments, the group consisting of:
  a) digital subscriber line environment;
  b) cable model termination system environment;
  c) a packet data serving node (PDSN) for code division multiple access (CDMA) environment; and
  d) a home agent environment for mobile IP services.

* * * * *